United States Patent
Chan

[11] Patent Number: 5,962,119
[45] Date of Patent: Oct. 5, 1999

[54] GYPSUM WALLBOARD AND PROCESS OF MAKING SAME

[75] Inventor: Thomas C. Chan, Hillsborough County, Fla.

[73] Assignee: Celotex Corporation, Tampa, Fla.

[21] Appl. No.: 08/929,266

[22] Filed: Sep. 11, 1997

Related U.S. Application Data

[63] Continuation-in-part of application No. 08/691,635, Aug. 2, 1996, abandoned.

[51] Int. Cl.[6] .................. B32B 3/26; B32B 31/12
[52] U.S. Cl. ........................ 428/312.4; 428/318.4; 428/537.7; 156/43; 156/44
[58] Field of Search ............. 428/312.4, 318.4, 428/310.5, 537.7; 156/43, 44

[56] References Cited

U.S. PATENT DOCUMENTS

| | | |
|---|---|---|
| 149,615 | 4/1874 | Staight et al. . |
| 1,489,693 | 4/1924 | Brookby . |
| 1,932,956 | 10/1933 | Crandell ................. 154/2 |
| 2,731,377 | 1/1956 | Riddell et al. ............. 154/88 |
| 2,762,738 | 9/1956 | Teale ..................... 154/87 |
| 2,985,219 | 5/1961 | Summerfield ............... 154/1 |
| 3,984,596 | 10/1976 | Failmezger ............... 428/144 |
| 4,128,699 | 12/1978 | Kole et al. ................ 428/498 |
| 4,279,673 | 7/1981 | White et al. ............... 156/39 |
| 4,327,146 | 4/1982 | White .................... 428/308.8 |
| 4,392,896 | 7/1983 | Sakakibara ................ 156/39 |
| 5,116,671 | 5/1992 | Bruce et al. .............. 428/309.9 |

FOREIGN PATENT DOCUMENTS

| | | |
|---|---|---|
| 2390486 | 1/1979 | France . |
| 879392 | 10/1961 | United Kingdom . |
| 1093369 | 11/1967 | United Kingdom ............ E04F 13/00 |
| 1123651 | 8/1968 | United Kingdom ............ E04F 13/00 |
| 2109839 | 6/1983 | United Kingdom ............ E04C 2/26 |

*Primary Examiner*—Christopher Raimund
*Attorney, Agent, or Firm*—Charles W. Vanecek

[57] ABSTRACT

A process for continuously manufacturing gypsum board having a gypsum core and at least one fibrous cover sheet comprising: (A) applying a defoaming agent to the top surface of the fibrous sheet as it advances along a production line; (B) depositing a foamed gypsum slurry onto the treated surface of the sheet; and (C) forming the composite of the foamed gypsum slurry and fibrous sheet into a gypsum board having a strong bond between the gypsum core and the fibrous cover sheet. The gypsum core-to-fibrous facer bond is highly resistant to failure upon humidification.

18 Claims, 2 Drawing Sheets

5,962,119

GYPSUM WALLBOARD AND PROCESS OF MAKING SAME

This is a continuation-in-part of application Ser. No. 08/691,635, filed Aug. 2, 1996, now abandoned.

BACKGROUND OF THE INVENTION

1. Field of the Invention

This invention relates to gypsum boards having improved adhesion between the gypsum core and paper facers and to a method for manufacturing the same.

2. Description of the Prior Art

Typically, in the manufacture of gypsum board, a liquid foam is added to the board core slurry mix to replace a portion of the more expensive components of the core and thereby produce a lighter, easier to handle board. In the process, the foamed slurry of calcined gypsum is continuously deposited on a moving fibrous sheet which constitutes one cover for the final product. A second cover sheet is then applied on top of the slurry to form a sandwich which passes through a forming station which determines the width and thickness of the gypsum board.

A strong bond must be provided between the gypsum core and the paper covering sheets in the finished panel to prevent the separation or delamination of the paper from the core. Without a sufficiently strong bond, various environmental conditions can adversely impact the boards. For example, even a very brief exposure to high humidities can cause a weakening at or near the paper core interface and result in damage during storage and use of the boards. Various attempts have been made over the years to improve the paper-gypsum bond. One such attempt is disclosed in White U.S. Pat. No. 4,327,146 wherein, during the final processing steps in the paper manufacturing plant, a defoaming agent is applied to the paper surface which becomes the covering paper's inner face in the gypsum board. The thus manufactured paper is then transferred to the gypsum board manufacturing plant for use in producing the paper-covered gypsum board.

OBJECTS OF THE INVENTION

It is an object of the present invention to provide a simple and economical method for producing gypsum board with a fibrous covering on conventional board manufacturing equipment without any major modification of the equipment.

It is another object of the invention to provide an improved gypsum wallboard which is strong and lightweight and has a strong adhesive bond between its core and fibrous covering.

It is a further object of the invention to provide a process for producing a gypsum board which is highly resistant to bond failure on humidification.

It is an additional object of the invention to provide a high speed process for producing a gypsum board having strongly adherent facers on a continuous board machine which is generally conventional in construction but is adapted to manufacture the board of the invention.

It is a still further object of the invention to provide an apparatus which operates in a simple manner to produce a gypsum board having a strongly adherent covering.

SUMMARY OF THE INVENTION

The foregoing and other objects of the invention have been achieved by applying, during the production of faced gypsum board, a defoaming agent to the surface of a fibrous facer for improved adhesion of the facer to the gypsum core. The defoamer is applied on line to the facing material shortly before this material comes into contact with the foamed gypsum slurry. Gypsum wallboard is conventionally produced with a fibrous covering on each of the opposite major surfaces, and the defoamer is advantageously applied to the surface of each covering before these surfaces are brought into contact with the foamed gypsum slurry.

Since the defoaming agent is applied to the facer during the same overall operation which yields the final faced gypsum board, the board manufacturer can exercise a high degree of control over the defoaming treatment. The manufacturer can assure on the spot that a suitable coverage of defoamer is achieved and does not have to depend on a separate paper manufacturing process, as disclosed in U.S. Pat. No. 4,327,146.

In accordance with the invention, the bond between the gypsum core and its fibrous cover sheet(s) is strengthened by treating the cover sheet with the defoaming agent. The defoamer acts to increase the amount of gypsum crystals at the interface of the core and cover sheet, which results in a significant increase in bond strength. The amount of defoamer to be applied can vary over a wide range but is readily determined through routine experimentation for the particular defoamer and gypsum board-forming system so as to effect the objects of this invention. Generally about 0.015 to 0.4 pound of defoamer per MSF of facer will give satisfactory results, although greater or lesser amounts can be used.

Many conventional defoaming agents are available for use in the process of the invention. Suitable defoamers are disclosed in U.S. Pat. No. 4,327,146. They include oil-based substances and hydrocarbons modified by various additives such as surfactants and silica. Non-oil based defoamers can also be used. The defoaming agent is advantageously deposited as a dilute dispersion or solution to the inner face of the fibrous cover sheet. A suitable concentration of the defoamer in such mixtures is from about 1 to 10 weight percent.

The process of the invention includes the usual steps of making an aqueous slurry of foamed gypsum and facing the slurry with a fibrous covering before the drying and setting of the covered slurry to form a gypsum board. The covering may comprise any suitable fibrous facer such as a web formed from woven or non-woven organic or inorganic, natural or synthetic fibers or combinations thereof (e.g. paper). Generally, two such facings are applied to cover the two opposed major surfaces of the gypsum board. During the board formation, the surface of the fibrous facer which is to come into contact with the gypsum slurry is provided with a coating of the defoaming agent of the invention. The defoaming agent can be placed in various media for application to the fibrous facer by means such as spraying, brushing or by roller means.

In accordance with another embodiment of this invention, an apparatus is provided for producing the inventive gypsum board whose core is covered by tenacious fibrous sheets. The apparatus comprises means for advancing a lower cover sheet, means for applying a defoaming agent to the upper surface of the lower sheet, means for depositing a foamed gypsum slurry upon the treated surface of the lower sheet as it advances, means for advancing an upper cover sheet, means for applying a defoaming agent to a surface of the upper sheet, means for applying the upper sheet over the foamed gypsum slurry so that the treated surface of the upper sheet contacts the slurry and means for forming the composite of the foamed gypsum slurry between the cover sheets into a gypsum board.

DESCRIPTION OF THE DRAWINGS

The invention will now be described with reference to the accompanying drawings in which.

DETAILED DESCRIPTION OF THE INVENTION

Figure 1:
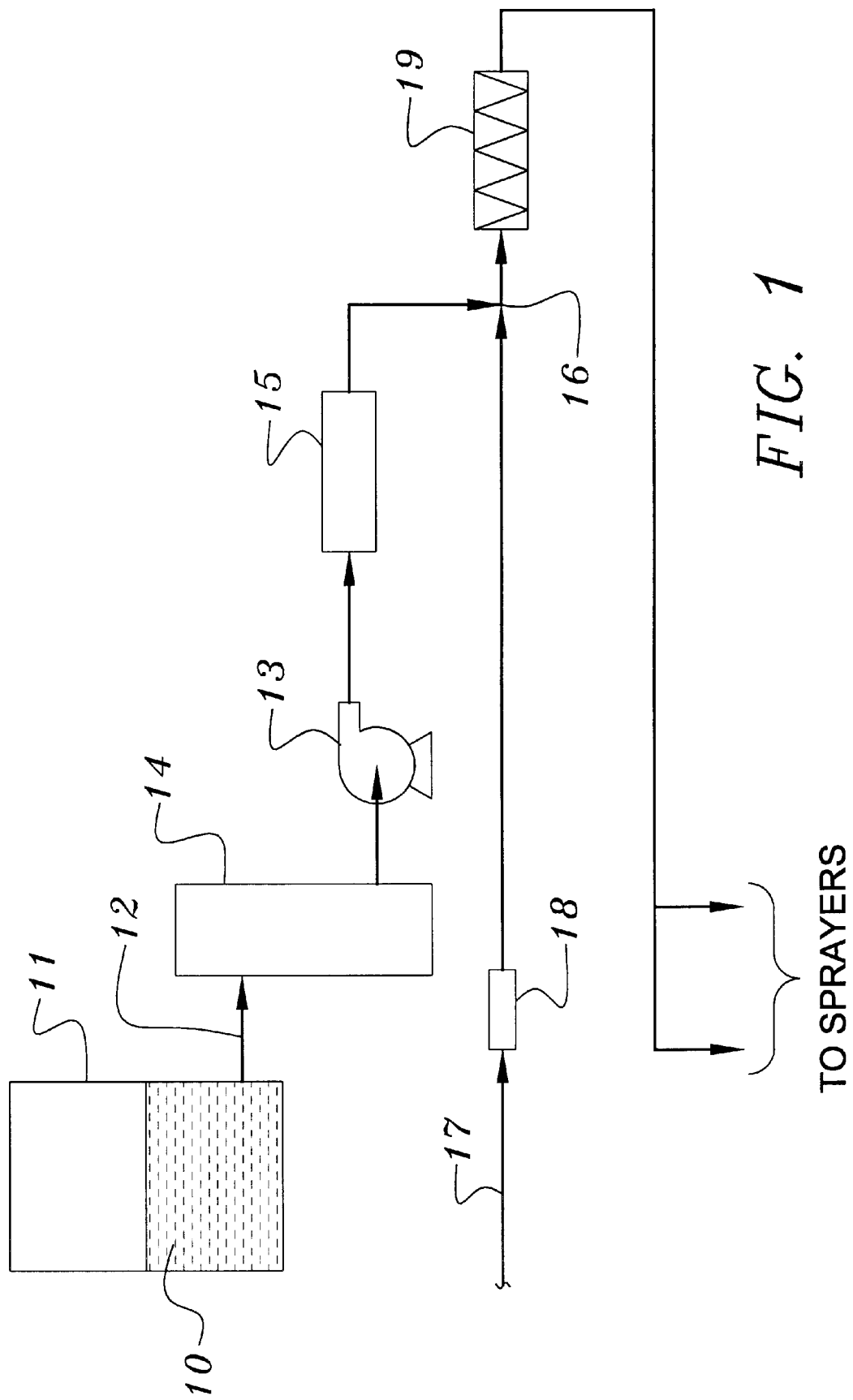
FIG. 1 is a diagrammatic side elevational view of apparatus for delivering a defoaming agent to a gypsum board production line.

Referring to the drawings, FIG. 1 shows an apparatus used to deliver a liquid defoaming agent 10 to spraying devices for discharge onto facing sheets in accordance with the process of the invention. The defoamer 10 is transported from raw material liquid tank 11 through line 12 by metering pump 13. Any solid contaminants are separated from the defoamer as it passes through sediment tank 14. A flow sensor 15 regulates the flow rate of defoamer 10 through pump 13 as it progresses to the "T"-intersection 16 into line 17. Water at ambient temperature is conducted through line 17 for dilution of the defoamer to an appropriate concentration for application to the facers. The water flow in line 17 is controlled by pressure regulator 18. The concentration of the defoamer in the dilute aqueous mixture is in the range of from about 2 to 7 weight percent, based on the total weight of the mixture. A static mixer 19 forms a homogeneous mixture of the water and defoamer.

Figure 2:
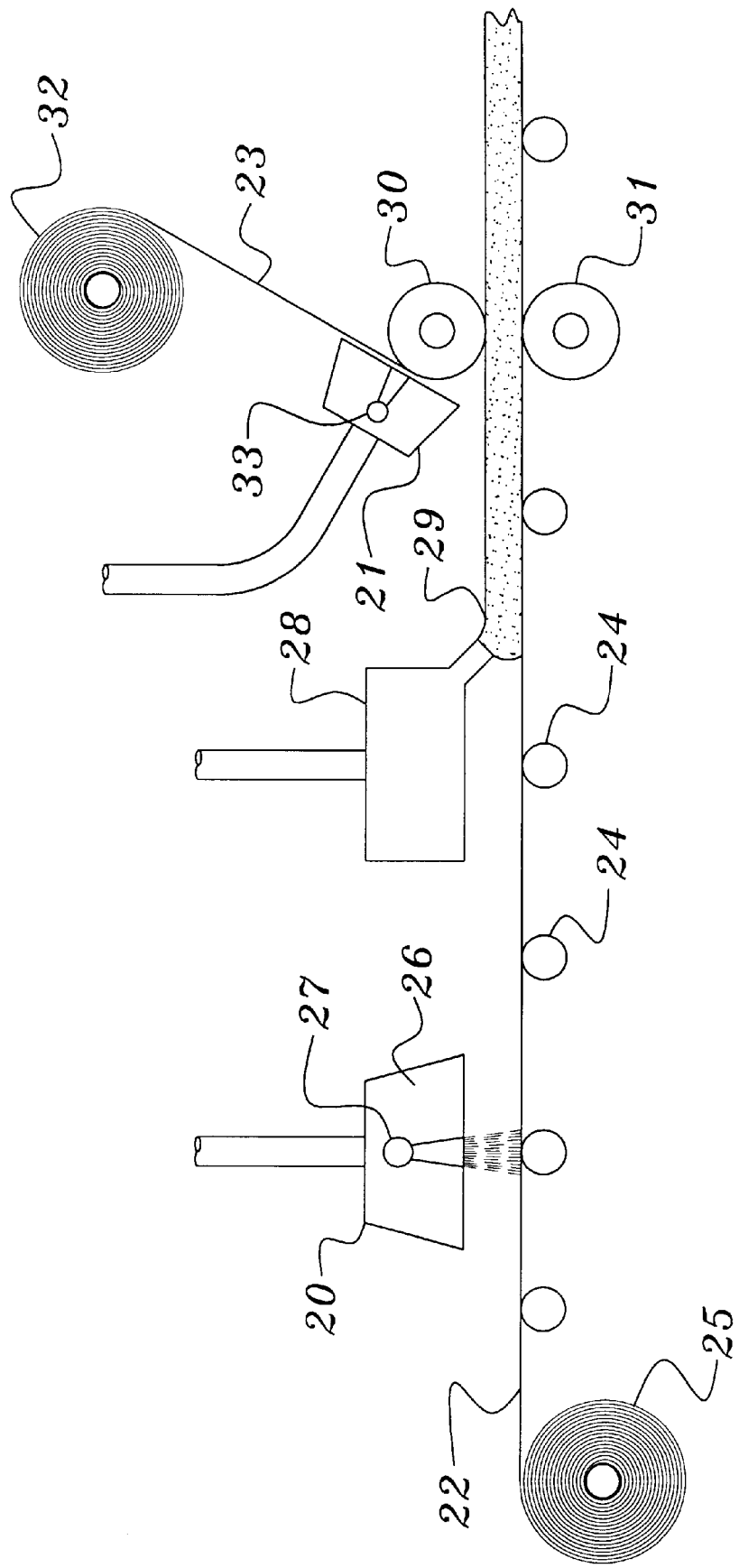
FIG. 2 is a diagrammatic side elevational view of apparatus for forming a gypsum board in accordance with the present invention.

As shown in FIG. 2, the diluted defoamer is conveyed to sprayer stations 20 and 21 which are suitably positioned above the continuously moving facing sheets 22 and 23 of the board manufacturing line. Facing sheets 22, 23 are desirably the conventional paperboard sheets generally employed in the manufacture of gypsum board. The plies may all be made of the same paper furnish or plies of different composition can be utilized. Generally, the wallboard paper covering sheets have a thickness in the range of 0.010–0.020 inch, and preferably 0.013–0.016 inch, and a tensile strength in the machine direction in the range of 60–120 pounds, and in the across-machine direction of 15–30 pounds.

The apparatus includes a series of rollers 24 for supporting and moving a belt (not shown) over which is advanced from roll 25 the lower paper facing sheet 22, which becomes the front or outer facing of the ultimate wallboards or panels. As bottom facing sheet 22 advances under the hood 26 of spraying station 20, a spray of the diluted defoamer is directed onto the upper surface of the sheet from spraying device 27 which suitably is a pipe having spray nozzles or the like. Spray pipe 27 is appropriately mounted approximately 1–18 inches above sheet 22 and operated at about 5 to 20 p.s.i. The amount of defoamer applied can vary over a wide range but generally is from about 0.04 pound per thousand board square feet to about 0.18 pound per thousand board square feet. Application of defoamer at higher levels, e.g., above about 0.5 lb/MSF, can destroy the bond.

A short distance (e.g., 3 to 10 feet) downstream from spraying station 20 lower sheet 22, whose upper surface is now coated with defoamer, moves underneath main mixer 28 to receive the foamed gypsum slurry 29. A pregenerated foam is conveniently fed into slurry mixer 28 along with the stucco, additional water and all other dry and wet ingredients which make up the board core formulation. Such ingredients, which may be added to enhance board properties such as waterproofness, strength and facer adhesion, include wax, glass fibers, inorganic minerals, vegetable fibers and starch. The slurry advantageously includes the starch at a concentration of at least 6 lbs. of starch for each thousand square feet of ½" gypsum board produced. More advantageously, the concentration of starch is 6 to 13 lbs., preferably 8 to 12 lbs., of starch per thousand square feet per ½" gypsum board. Mixer 28 may be a ball mixer, a pin mixer, a combination of both, or any other suitable type. The discharge from mixer 28 may be a single relatively wide stream of slurry but in actual practice, it is common to deposit several separate streams across the lower facing sheet. The streams merge by lateral flow before the sheet reaches the board-forming station, which for the embodiment shown in FIG. 2 comprises upper and lower caliper or master rolls 30 and 31, which are appropriately located about 5 to 20 feet downstream of mixer 28. A further preferred forming device is a forming plate.

The fibrous top cover sheet 23, which is applied over the surface of the gypsum slurry, is unwound from a roll 32 supported above the production line and passed about the pressure or forming roll 30. Disposed adjacent upper sheet 23 as it passes over roll 30 is spraying station 21 equipped with a spray device 33 for application of the diluted defoamer over the inner face of sheet 23, i.e., the surface which will contact the gypsum slurry. Sprayer 33, which is suitably a pipe equipped with spray nozzles, is operated in the manner previously described for sprayer 27 to cover the inner surface of sheet 23 with the defoamer. Upper cover sheet 23 passes under forming roll 30 simultaneously and at equal speed with the lower cover sheet 22 so as to carry with and between them an amount of the mixed slurry of gypsum core material in accordance with the opening provided between the upper and lower forming or shaping rolls 30 and 31. The two covering sheets, together with the gypsum core disposed between them, constitute the formed, but not as yet dried, gypsum board. Levelling of the slurry by the forming rolls produces a board having a thickness of about ¼ to 1 inch.

The composite assembly is next allowed to set, cut to desired lengths and continuously passed through a high temperature drying zone to remove any excess water that is not consumed in the hydration of the gypsum. Upon emergence from the drying zone, the product is passed to storage for ultimate use.

The invention is further illustrated by the following examples in which all parts and percentages are by weight unless otherwise indicated.

EXAMPLE 1

With reference to FIGS. 1 and 2, gypsum wallboard was produced continuously on a gypsum wallboard machine. A forming plate was utilized in place of forming rolls 30, 31. A 1% aqueous mixture of defoamer ("Foamaster® EH" available from Henkel Corporation) was sprayed by an air nozzle at sprayer station 20 onto one side of a face paper 22 for a period of approximately 3.5 minutes during the board production. The spraying was then shifted to the other side of the paper and the sequence was repeated.

Finally, the spraying was shifted to the center of face paper 22 and the sequence again repeated to complete the cycle for the 1% mixture on the paper. This operation was then repeated for 2% and 5% aqueous mixtures of the defoamer. The entire procedure was repeated on back paper 23, with spraying of the defoamer from an air nozzle at sprayer station 21. Control boards without defoamer were also produced.

Board samples (12"×48"), which had been subjected to the above treatment, were individually cut into 12 strips (12"×4"). These strips and strips cut from the control boards were then placed inside a humidifying room at 90° F. and 90% relative humidity. After 4 hours, the strips were scored transversely and their face and back papers were peeled from the core material. A bond overlay grid having 100 squares was placed over the inner paper surface exposed by the peeling and the number of squares of paper showing through the grid were counted. This number, which indicates the strength of the gypsum-paper bond, is termed the percent humid bond. The average percent humid bonds determined for the face and back papers across the whole width of the boards treated by the defoamer and of the control boards are presented in the following Table 1.

The data of Table 1 show that the humid bond improved substantially when the defoamer was applied to the paper. For each application site and defoamer level, the samples treated with the defoaming agent showed improvement in humid bond when compared with the untreated samples. The average increases in % humid bond are presented in Table 2 below. The highest average increase in face paper humid bond was 38.50%, obtained through treatment with the defoamer at a 2% concentration. However, the increase was only 14.45% upon treatment with the defoamer at a 5% level. This lower humid bond may indicate that excessive usage of the defoamer will prohibit the promotion of wet bond to the face paper during board rehydration.

The highest increase in the back paper humid bond was 67.93% when treated with the 5% defoamer mixture. Some of the air pockets generated by the foam generator will rise to the back paper-to-core interface during rehydration on the board belt. This higher aggregation of air voids at the back paper-to-core interface may require a more potent defoaming action to break them down. Thus, a more concentrated defoamer mixture may be more effective when used on the back paper than on the face paper. These optimum concentrations may change if other methods are used to apply the defoamer onto the paper.

TABLE 2

AVERAGE INCREASE IN HUMID BOND (%)

|  | Increase in Face Humid Bond (%) | Increase in Back Humid Bond (%) |
| --- | --- | --- |
| 1% solution | 23.30 | 52.88 |
| 2% solution | 38.50 | 28.10 |
| 5% solution | 14.45 | 67.83 |

EXAMPLE 2

Gypsum boards were prepared in accordance with the general procedure described in Example 1. Spraying was started on back paper 23 at a flow rate of 80 lb. of defoaming mixture per hour (1.98 lb./MSF). A 2% defoamer mixture was sprayed onto the full width of the back paper for approximately 6 minutes. The operation was then repeated for 4% and 6% mixtures. After the completion of the cycle at 80 lb./hr., the spraying rate was then increased to 100 lb./hr. (2.48 lb./MSF) and then finally to 120 lb./hr. (2.98 lb/MSF). At each spraying rate, the back paper was treated with 2%, 4% and 6% mixtures. The whole procedure was duplicated on the face paper at a spraying rate of 70 lb./hr., 85 lb./hr. and 100 lb./hr. with 2%, 3%, 4% and 5% mixtures.

The average % humid bond for the face and back papers of the treated board and control board samples from the above run were determined according to the method of Example 1. The results of the trial run are given in the following Tables 3 and 4 for the face and back papers.

As revealed in Table 3, face papers treated at 70 lb./hr. yielded an average humid bond of 87.4%. The bond was particularly low at 75.1% when treated with the 5% mixture. At 85 lb./hr., the average bond improved to 93.6% and the highest bond within this subgroup was 96.4% when a 4% mixture was used. At 100 lb./hr., the average bond was 90.1% but wide variances existed within the subgroup. The data indicate bond performance was optimum at 85 lb./hr. (2.11 lb./MSF) with a 4% defoamer mixture. Although the maximum face paper bond was achieved when the face paper was treated at 100 lb./hr. (2.48 lb./MSF) with a 5%

TABLE 1

AVERAGE HUMID BOND (%)

| RIGHT SIDE | | LEFT SIDE | | CENTER | |
| --- | --- | --- | --- | --- | --- |
| CONTROL | INVENTIVE | CONTROL | INVENTIVE | CONTROL | INVENTIVE |
| FACE PAPER (1% DEFOAMER) | | | | | |
| 92.2 | 99.8 | 71.2 | 100 | 64.25 | 97.75 |
| FACE PAPER (2% DEFOAMER) | | | | | |
| 66.8 | 98.4 | 43.75 | 97.8 | 65.4 | 95.25 |
| FACE PAPER (5% DEFOAMER) | | | | | |
| 96.5 | 96.5 | 70 | 95 | 65.4 | 83.75 |
| BACK PAPER (1% DEFOAMER) | | | | | |
| 12.8 | 57.2 | 22.8 | 72.8 | -0- | 64.25 |
| BACK PAPER (2% DEFOAMER) | | | | | |
| 13.6 | 39 | 15.6 | 48 | -0- | 26.5 |
| BACK PAPER (5% DEFOAMER) | | | | | |
| 10.8 | 89 | 37 | 86.6 | -0- | 76 | mixture, bond variation is higher at 100 lb./hr. than at 85 lb./hr. The Table 4 results indicate that optimum adhesion for the back paper can also be achieved through use of a 4% defoamer mixture, with treatment in this case at a 2.48 lb./MSF level.

TABLE 3

FACE PAPER RESULTS

| TOTAL MIXTURE | | DEFOAMER | | | HUMID BOND (%) | |
|---|---|---|---|---|---|---|
| FLOW | | FLOW | | CONC. | | STANDARD |
| (LB/HR) | (LB/MSF) | (LB/HR) | (LB/MSF) | (%) | AVERAGE | DEVIATION |
| 70 | 1.74 | 1.4 | 0.03 | 2 | 90.3 | 8.3 |
| 70 | 1.74 | 2.1 | 0.05 | 3 | 93.5 | 6.5 |
| 70 | 1.74 | 2.8 | 0.07 | 4 | 90.6 | 7 |
| 70 | 1.74 | 3.5 | 0.09 | 5 | 75.1 | 26.8 |
| 85 | 2.11 | 1.7 | 0.04 | 2 | 91.8 | 12.9 |
| 85 | 2.11 | 2.5 | 0.06 | 3 | 92.4 | 9.8 |
| 85 | 2.11 | 3.4 | 0.08 | 4 | 96.4 | 3.3 |
| 85 | 2.11 | 4.3 | 0.11 | 5 | 93.8 | 5.7 |
| 100 | 2.48 | 2 | 0.05 | 2 | 83.8 | 27 |
| 100 | 2.48 | 4 | 0.10 | 4 | 89.3 | 16.8 |
| 100 | 2.48 | 5 | 0.12 | 5 | 97.3 | 2.6 |

TABLE 4

BACK PAPER RESULTS

| TOTAL MIXTURE | | DEFOAMER | | | HUMID BOND (%) | |
|---|---|---|---|---|---|---|
| FLOW | | FLOW | | CONC. | | STANDARD |
| (LB/HR) | (LB/MSF) | (LB/HR) | (LB/MSF) | (%) | AVERAGE | DEVIATION |
| 80 | 1.98 | 1.6 | 0.04 | 2 | 81.6 | 11.8 |
| 80 | 1.98 | 3.2 | 0.08 | 4 | 66.5 | 20.4 |
| 80 | 1.98 | 4.8 | 0.12 | 6 | 59.4 | 19.9 |
| 100 | 2.48 | 2 | 0.05 | 2 | 90.8 | 5.3 |
| 100 | 2.48 | 4 | 0.10 | 4 | 93.6 | 4.3 |
| 100 | 2.48 | 6 | 0.15 | 6 | 79.8 | 16.1 |
| 120 | 2.98 | 2.4 | 0.06 | 2 | 91.8 | 7.2 |
| 120 | 2.98 | 4.8 | 0.12 | 4 | 91.6 | 7.0 |
| 120 | 2.98 | 7.2 | 0.18 | 6 | 74.1 | 25.6 |

I claim:

1. A process for continuously manufacturing gypsum board having a gypsum core and at least one fibrous cover sheet comprising continuously (a) applying a defoaming agent on the surface of a continuously advancing fibrous sheet, (b) depositing a foamed gypsum slurry onto the treated surface of the sheet, and (c) forming the composite of the foamed gypsum slurry and fibrous sheet into a gypsum board having a strong bond between the gypsum core and the fibrous cover sheet, wherein the slurry contains starch at a concentration of 6 to 13 lbs. per thousand square feet of gypsum board per ½ inch of thickness.

2. The process of claim 1 wherein application of the defoaming agent on the surface of the fibrous sheet is accomplished by spraying of the defoaming agent.

3. The process of claim 1 wherein the defoaming agent is applied to the top of the fibrous sheet as the sheet is continuously advanced along a production line, and defoaming agent is continuously applied on the surface of a second fibrous cover sheet as the second sheet continuously advances along the line, the second sheet being placed on top of the foamed gypsum slurry with the treated surface of the second sheet contacting the slurry so that the foamed gypsum slurry is disposed between and contacts the treated surfaces of the two fibrous sheets.

4. The process of claim 1 wherein the fibrous sheet comprises a paper sheet.

5. The process of claim 1 wherein the defoaming agent comprises a member selected from the group consisting of an oil and a hydrocarbon.

6. The process of claim 1 wherein the amount of defoaming agent applied to the fibrous sheet is from about 0.015 to 0.5 pound per thousand board square feet.

7. The process of claim 1 wherein the defoaming agent is applied to the fibrous sheet as a dilute dispersion or solution.

8. The process of claim 7 wherein the concentration of the defoaming agent is from about 1 to 10 weight percent.

9. The process of claim 1 wherein the fibrous sheet comprises a paper sheet, and the defoaming agent is applied to the top of the paper sheet as the sheet is continuously advanced along a production line, and defoaming agent is continuously applied on the surface of a second paper cover sheet as the second sheet continuously advances along the line, the second sheet being placed on top of the foamed gypsum slurry with the treated surface of the second sheet contacting the slurry so that the foamed gypsum slurry is disposed between and contacts the treated surfaces of the two paper sheets.

10. The process of claim 9 wherein the application of defoaming agent on the surface of each paper sheet is accomplished by spraying of the defoaming agent.

11. The process of claim 9 wherein the defoaming agent comprises a member selected from the group consisting of an oil and a hydrocarbon.

12. The process of claim 9 wherein the amount of defoaming agent applied to each paper sheet is from about 0.015 to 0.5 pound per thousand board square feet.

13. The process of claim 9 wherein the defoaming agent is applied to each paper sheet as a dilute dispersion or solution.

14. The process of claim 13 wherein the concentration of the defoaming agent is from about 1 to 10 weight percent.

15. The process of claim 9 wherein an aqueous mixture of the defoaming agent is sprayed on each paper sheet.

16. The process of claim 15 wherein the amount of defoaming agent applied to each paper sheet is from about 0.015 to 0.5 pound per thousand board square feet.

17. A gypsum board produced by the process of claim 1.

18. A gypsum board produced by the process of claim 9.

* * * * *